Jan. 3, 1928. J. F. O'CONNOR Re. 16,846

FRICTION SHOCK ABSORBING MECHANISM

Original Filed July 23, 1923 2 Sheets-Sheet 1

Witnesses

Wm. Geiger

Inventor

John F. O'Connor

By George I. Haight Its Atty.

Jan. 3, 1928. J. F. O'CONNOR Re. 16,846

FRICTION SHOCK ABSORBING MECHANISM

Original Filed July 23, 1923 2 Sheets-Sheet 2

Witnesses

Wm. Geiger

Inventor

John F. O'Connor

By George I. Haight

His Atty.

Reissued Jan. 3, 1928.

Re. 16,846

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Original No. 1,586,322, dated May 25, 1926, Serial No. 653,114, filed July 23, 1923. Application for reissue filed October 21, 1927. Serial No. 227,826.

This invention relates to improvements in friction shock absorbing mechanisms.

One object of the invention is to provide a friction shock absorbing mechanism, more particularly adapted for railway draft riggings, wherein is obtained high capacity due to the large frictional areas, and wherein a differential wedge action is made use of to assure quick and certain release of a plurality of friction plates.

Another object of the invention is to provide a friction shock absorbing mechanism of the type referred to wherein a graduated action in both compression and release is obtained by producing a preliminary action of the followers and wedges prior to engagement and relative movement of the friction plates.

Other objects and advantages of the invention will more clearly appear from the description and claims hereinafter following.

Figure 1:
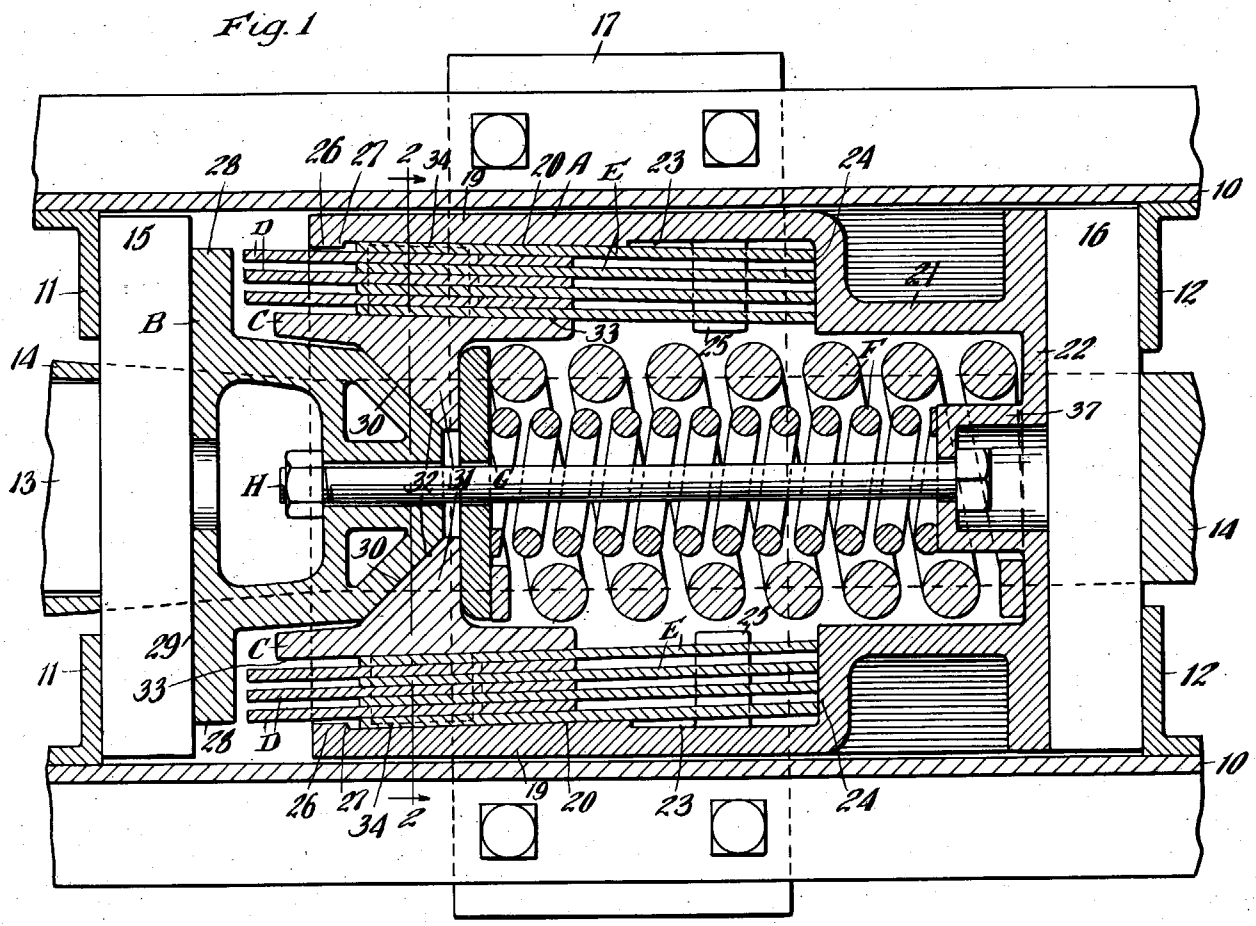
Figure 2:
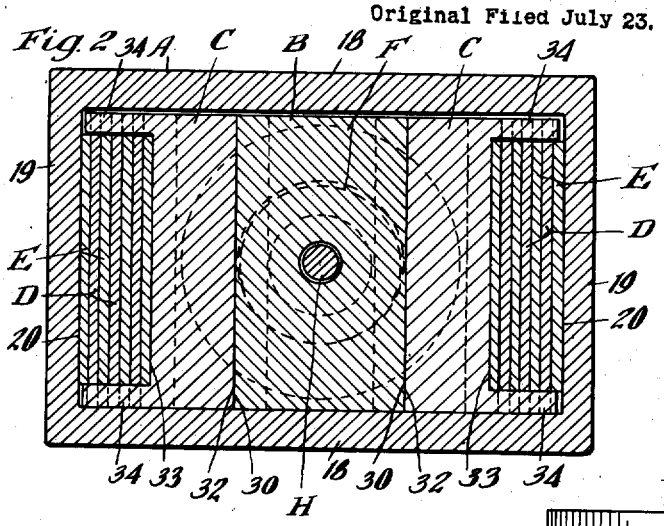
Figure 3:
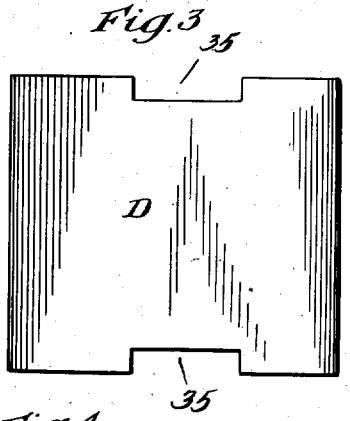
Figure 4:
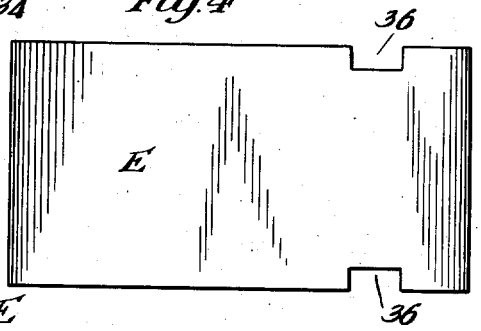
Figure 5:
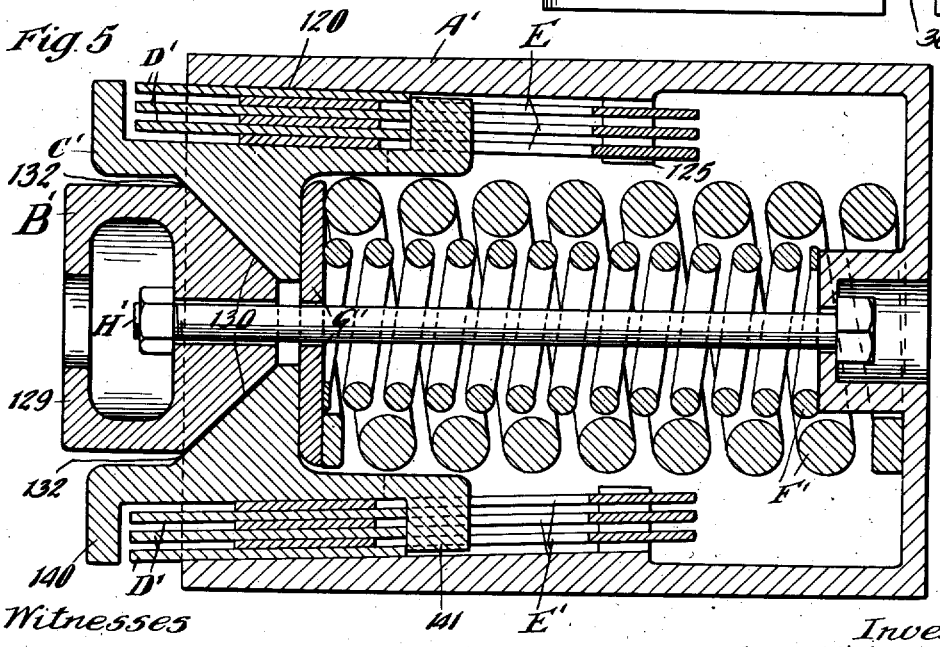

In the drawings forming a part of this specification, Figure 1 is a horizontal, longitudinal, sectional view of a portion of a railway draft rigging showing my improvements in connection therewith. Figure 2 is a vertical, transverse sectional view corresponding substantially to the line 2—2 of Figure 1. Figures 3 and 4 are detailed side elevational views respectively of a stationary and a relatively movable friction plate. And Figure 5 is a horizontal, longitudinal sectional view of the shock absorbing mechanism proper, the front and rear followers being omitted, illustrating a different embodiment of the invention.

In said drawings, referring first to Figures 1 to 4, inclusive, 10—10 denote channel draft sills of a car underframe, to the inner faces of which are secured front stop lugs 11 and rear stop lugs 12. A portion of the drawbar is indicated at 13, the same being operatively associated with a hooded cast yoke 14 within which is disposed the shock absorbing mechanism proper, a front follower 15 and a rear follower 16. The yoke and the parts therein are supported in operative position by a detachable saddle plate 17.

The improved shock absorbing mechanism proper, as shown in Figures 1 to 4, inclusive, comprise broadly, a combined friction shell and spring cage casing A; a central wedge B; a pair of wedge friction shoes C—C; two series of movable friction plates D—D; two series of relatively stationary friction plates E—E; a spring resistance element F; a spring follower plate G; and a retainer bolt H.

The casting A is provided at its front or outer end with a friction shell proper defined by top and bottom walls 18—18 and side walls 19—19, the latter being provided on their inner sides with flat surfaces 20—20 converging slightly inwardly of the shell. Rearwardly of the shell proper, the casting A is reduced in size to provide a spring cage 21 or casing to accommodate and center the spring resistance F. At its rear end the casting A is formed with an integral vertical wall 22 extended laterally to engage with the rear follower 16. Rearwardly of the converging faces 20, the side walls 19 are cut away as indicated at 23. Transverse shoulders 24 adapted to form abutments for the rear ends of the stationary friction plates E are presented at the point of reduction of the shell proper. Adjacent the rear end of the shell proper and spaced outwardly from the shoulders 24 the upper and lower walls 18 of the shell are provided with upwardly and downwardly projecting ribs 25 extending inwardly from the side walls 19 a short distance; the inner ends of the same being spaced apart a sufficient distance to accommodate the spring resistance therebetween. At the front end of the shell proper, the side walls thereof are provided with inwardly projecting short flanges 26, thereby presenting vertically extending stop shoulders 27.

The central wedge B is in the form of a hollow block having laterally extending flanges 28. The wedge block B is provided with a flat front face 29 adapted to abut the front follower 15 and a pair of rearwardly converging flat wedge faces 30.

The friction wedge shoes C are of like construction and are arranged on opposite sides of the central wedge B. Each of the friction shoes C is in the form of an elongated block having lateral extensions 31 projecting inwardly toward the axis of the mechanism. Each of the extensions 31 is provided with a front wedge face 32 correspondingly inclined to and co-operating with the adjacent wedge face 30 of the wedge B and a flat rear face adapted to co-act with a spring follower G. At the outer side, each of the friction wedge shoes is provided with a relatively long flat friction face 33 adapted to co-act with the adjacent innermost friction plate D. At their upper and lower sides, the wedge shoes C are formed with laterally extending vertically spaced lugs 34 for a purpose hereinafter described, said lugs being formed integral with the shoes.

The friction plates D and E are disposed within the friction shell and comprise two oppositely arranged groups. As herein shown, the groups of plates each comprise three plates D and four plates E, the plates D and E being alternated, with two plates E of each group arranged respectively outer and innermost in contact with the inner surface 20 of the adjacent side wall 19 and the elongated friction surface 33 of the corresponding shoe C. Upon reference to Figure 1, it will be seen that the plates D and E composing each group are thus arranged parallel to the adjacent friction surface 20, so that the two groups of opposed plates diverge inwardly with reference to each other.

The plates D are all of like construction, and as best known in Figure 3, each of the same is formed with relatively long upper and lower vertically aligned slots between the ends thereof, the slots 35 being spaced a greater distance from the front end of the plate than from the rear end thereof. The slots 35 of each plate D are adapted to co-act with the upper and lower lugs 34 of one of the wedge shoes C, the slots being of an appreciably greater length than the width of the lugs, so that each set of four plates D and the adjacent shoes C may have limited relative movement.

The plates E are all of like construction, and as best shown in Figure 4 each of the same is provided with upper and lower vertically aligned short slots 36 near the rear end thereof. The slots 36 of the plates E correspond in length to the width of the ribs 25 which they are adapted to receive. The plates E are thus anchored to the casting A, the slots 36 and ribs 25 being so spaced with reference to the transverse walls 24 that the rear ends of the plates abut the walls. The plates E are of such a length that the front ends thereof are disposed inwardly of the outer end of the shell as clearly shown in Figure 1. The plates E are thus held against outward movement by ribs 25, and against inward movement by the combined action of the ribs and walls 24. It will be evident that the walls 24 provide a solid abutment for the plates E which assume a large proportion of the forces applied during compressive action of the mechanism.

The spring resistance element F comprises a relatively heavy outer coil and a relatively lighter inner coil. The outer coil has its opposite ends abutting respectively, the rear wall 22 of the casting A and the spring follower plate G, the rear end of the spring being centered by an inwardly projecting hollow boss 37 on the rear wall 22 of the cage. The inner coil has its opposite ends abutting respectively the spring follower and the end of the boss 37.

The shock absorbing mechanism is held in assembled relation and under initial compression by the retainer bolt H passing through the inner coil of the spring resistance and aligned openings in the wedge block B, spring follower plate G and boss 37, having its opposite ends anchored in the wedge B and the boss 37, respectively.

When the parts are in normal position, as clearly shown in Figure 1, the friction plates D protrude from the shell and have their front ends slightly spaced inwardly from the flanges 28 of the wedge B, the front edges of the lugs 34 of the shoes being in engagement with the outer end walls of the slots 35 of the plates D, and the shoes being held in their outermost position by the action of the spring resistance F.

The operation of the improved shock absorbing mechanism shown in Figures 1 to 4, inclusive, is as follows, assuming an inward or buffing movement of the drawbar. Upon inward movement of the drawbar, the follower 15 will be forced inwardly, thereby moving the wedge B simultaneously and uniformly therewith. As the flanges 28 of the wedge are normally spaced from the plates D, there will be no action of the plates D during the initial movement of the wedge, but the entire wedging system, including the wedge B, shoe C, together with the spring follower plate G will be moved longitudinally inwardly against the resistance of the spring independently of any movement of the plates D. It will be evident that, as the innermost plate of each group on which the corresponding wedge shoe slides, is always held against movement longitudinally of the shell, the movement of the shoes will have no effect on the movable plates D.

During this first part of the compression stroke, it will be evident that the lugs 34 on the wedge shoes C will be moved from engagement with the front walls of the slots 35 of the plates D, this movement of the lugs being permitted by the relatively great length of the slots 35.

Furthermore a wedging or spreading action will be set up between the wedge and the shoes, and a differential wedge action will also be had due to the converging relation of the innermost fixed plates E on which the shoes C slide, thereby further compressing the spring resistance.

After the initial movement of the follower 15 and the wedge system including the wedge B, the flanges 28 of the wedge engage the plates D and thereafter the latter move in unison with the wedge B, thus generating the desired frictional capacity supplemental to the spring capacity, the stationary plates being effectively held against inward movement by the abutment walls 24. Movement of the front follower 15 will finally be limited by engagement with the front end of the casting A, the pressure being directly transmitted through the casting to the rear follower, the casting acting as a pressure transmitting column when the mechanism has been fully compressed.

Upon removal of the actuating force, the springs are free to expand and in so doing force the follower G, shoes C and the wedge B outwardly relatively to all of the friction plates. This action is instantaneous and extremely sensitive for the reason that there is no movement of any of the friction plates during the initial part of the release action and that the innermost plates with which the shoes co-act are arranged in outwardly diverging relation. After release of the wedging system and forcing the same outwardly a limited distance, the pressure on the friction plates will have been reduced substantially to a minimum and upon the lugs 34 coming into engagement with the outer walls of the slots 35, of the plates D, the latter may be easily projected outwardly to the normal position.

It will be evident that there will be no movement of the outer plates E on the converging surface 20 of the shell during either compression or release, and that these plates therefore serve as liners in addition to acting as friction plates.

As the different friction and wedge surfaces become worn, compensation therefor is had by the expansive action of the spring, which is under initial compression, as hereinbefore described.

Referring next to the construction illustrated in Figure 5, the arrangement is generally the same as that hereinbefore described except that a casing A′ is of box-like form, that the stationary plates E′ are held against longitudinal inward movement solely by a transverse rib 125 corresponding to the rib 25, that the groups of plates each compose three movable and three relatively stationary plates D′ and that the movable plates are moved inwardly longitudinally of the shell by flanges on the wedge shoes C′ instead of being moved directly by the wedge B′. The relative arrangement of the plates of each group is also somewhat different due to the same comprising an equal number of fixed and movable plates, a movable plate D′ of each group being arranged outermost and having sliding engagement with the adjacent inner surface 120 of the corresponding side wall of the shell. The inner surfaces 120 of the side walls converge rearwardly of the shell and the opposite groups of plates also converge rearwardly correspondingly.

The central wedge block B′ is provided with a flat front face 129 adapted to engage the front follower and rearwardly converging wedge faces 130, each adapted to co-act with an outer wedge face 132 on the corresponding shoe C′. Each of the shoes C′ is provided with a lateral flange 140 at the forward end thereof normally slightly spaced from the front ends of the plates D′ and adapted to co-act therewith in a manner similar to the flanges 28 of the wedge B to move the plates D′ inwardly lengthwise of the shell after the wedging action has been set up. Each of the shoes C′ is also provided with a laterally projecting lug 141 at the rear end thereof adapted to work in horizontally extending relatively long slots in the stationary plates E′ of the adjacent group and engage with the rear ends of the movable plates D′ of said group to restore the same to normal position.

It will be evident that the shoes C′ will be moved rearwardly by the wedge B′ during the compression of the mechanism and that while the flanges 140 of the shoes approach the front ends of the plates D′ during initial action of the mechanism, the lugs 141 will be moved rearwardly and out of engagement with the plates E′, functioning similarly to the lugs 34. The construction, arrangement and operation of the spring resistance F′, spring follower G′ and retainer bolt H′ is identical in all respects with the corresponding parts shown in Figure 1.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a shell; of an outer follower movable relatively toward and from the shell; a lateral wedge pressure creating means co-acting with said follower, said means including friction shoes; a plurality of intercalated friction elements within the shell, said elements being divided into two inwardly converging groups on opposite sides of said wedge pressure creating means, alternate plates of each group being anchored to the shell and the remaining plates being movable relatively thereto during a compression stroke; means within said shell for yieldingly resisting inward movement of said shoes independently of said movable friction elements; and means on said shoes engaging said movable elements to restore the same to normal position.

2. In a friction shock absorbing mechanism, the combination with a shell provided with interior rearwardly converging surfaces; of an outer follower movable relatively toward and from the shell; a wedge movable with said follower, friction shoes co-acting with said wedge, each of said shoes having friction surface arranged parallel to the corresponding interior surface of the shell; means for yieldingly resisting rearward movement of said shoes; and a plurality of longitudinally arranged intercalated friction elements within said shell, said elements being divided into groups on opposite sides of said shoes and adapted to co-act with the friction surfaces thereof, the elements composing each group being arranged in parallel relation to each other and the adjacent inner surface of said shell, alternate elements of each group being anchored to said shell, and the remaining elements being also movable relatively to said anchored elements during a compression stroke, said movable elements and shoes having inter-engaging stop shoulders for effecting restoration of the last named elements to normal position and permitting limited relative movement between the same and the shoes.

3. In a friction shock absorbing mechanism, the combination with a friction shell; of a plurality of friction elements within the shell, certain of said elements being fixed against longitudinal movement with reference to said shell and the remaining elements being movable longitudinally of said shell; lateral pressure transmitting means movable longitudinally of the shell, said means including friction shoes having means thereon, engageable with said movable elements and providing a lost motion connection between the shoes and the movable elements for restoring the latter to normal position; and spring means resisting inward movement of the shoes, said spring means being operative to return said shoes to normal position when the actuating force is reduced.

4. In a friction shock absorbing mechanism, the combination with a plurality of longitudinally disposed relatively movable coacting friction elements; of means for moving said elements relatively to each other; means for resisting lateral movement of said elements; a friction wedge system co-operating with said elements for placing the same under lateral pressure, said system including a friction shoe engaging one of said elements, said shoe having a fixed lug coacting with certain of said plates for restoring the same to normal position; and a spring resistance co-acting with said shoe.

5. In a friction shock absorbing mechanism, the combination with a plurality of longitudinally disposed relatively movable co-acting friction elements; of means for moving said elements relatively to each other; means for resisting lateral movement of said elements; a friction wedge system co-operating with said elements for placing the same under lateral pressure, said system including a friction shoe having a lost motion connection with certain of said elements, said lost motion connection including a fixed lug on said shoe engaging said last named elements for restoring the same to normal position; and a spring resistance co-acting with said shoe.

In witness that I claim the foregoing I have hereunto subscribed my name this 11th day of October, 1927.

JOHN F. O'CONNOR.